(12) United States Patent  
Khojastepour et al.

(10) Patent No.: US 11,048,890 B2  
(45) Date of Patent: Jun. 29, 2021

(54) WALK-THROUGH CHECKOUT STATION

(71) Applicant: NEC Laboratories America, Inc., Princeton, NJ (US)

(72) Inventors: Mohammad Khojastepour, Lawrenceville, NJ (US); Mustafa Arslan, Princeton, NJ (US); Sampath Rangarajan, Bridgewater, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 16/565,770

(22) Filed: Sep. 10, 2019

(65) Prior Publication Data

US 2020/0226331 A1 Jul. 16, 2020

Related U.S. Application Data

(60) Provisional application No. 62/791,132, filed on Jan. 11, 2019, provisional application No. 62/791,138, filed on Jan. 11, 2019.

(51) Int. Cl.
| | |
|---|---|
| *G06K 15/00* | (2006.01) |
| *G06K 7/10* | (2006.01) |
| *H04L 5/14* | (2006.01) |
| *H04B 1/00* | (2006.01) |
| *G07G 1/00* | (2006.01) |

(52) U.S. Cl.
CPC ......... *G06K 7/10128* (2013.01); *G07G 1/009* (2013.01); *H04B 1/0064* (2013.01); *H04L 5/14* (2013.01)

(58) Field of Classification Search
CPC .. G06K 7/10128; G07G 1/009; H04B 1/0064; H04L 5/14
USPC .......................................... 235/383, 379, 380
See application file for complete search history.

(56) References Cited

U.S. PATENT DOCUMENTS

2016/0307087 A1* 10/2016 Cruickshanks ...... H04B 5/0062  
2017/0224438 A1* 8/2017 Johnson .................. A61B 90/90

OTHER PUBLICATIONS

Chen et al., "Multiantenna RFID Reader With Blind Adaptive Beamforming", IEEE Internet of Things Journal, Dec. 2016, pp. 986-996, vol. 3, No.  
Shangguan et al., "The Design and Implementation of a Mobile RFID Tag Sorting Robot", MobiSys'16 Jun. 2016, pp. 31-42.  
Wang et al., "Rf-IDraw: Virtual Touch Screen in the Air Using RF Signals", SIGCOMM'14, Aug. 2014, 12 pages.

\* cited by examiner

*Primary Examiner* — Karl D Frech  
(74) *Attorney, Agent, or Firm* — Joseph Kolodka

(57) ABSTRACT

Systems and methods for implementing a radio frequency identifier (RFID) system are provided. The methods include transmitting a radio frequency (RF) signal, by an RFID interrogator with multiple antennas. The methods include receiving a superimposed received signal. The superimposed received signal includes replies from a first RFID tag and a second RFID tag that are overlapping in time. The methods also include separating the replies from the first RFID tag and second RFID tag though spatial processing of the superimposed received signal.

17 Claims, 8 Drawing Sheets

WALK-THROUGH CHECKOUT STATION

RELATED APPLICATION INFORMATION

This application claims priority to U.S. Provisional Patent Application No. 62/791,132, filed on Jan. 11, 2019, and U.S. Provisional Patent Application No. 62/791,138, filed on Jan. 11, 2019, incorporated herein by reference herein in their entireties.

BACKGROUND

Technical Field

The present invention relates to radio-frequency identification (RFID) and more particularly to detection of RFID tags.

Description of the Related Art

RFID tags come in a variety of configurations, sizes, read ranges, memory amounts, etc. Even though the use of RFID tags is not yet widespread, some stores are leveraging RFIDs in their daily operations and some governments have embarked on initiatives to deploy RFID based check-out in the next few years. The use of RFID tags for theft prevention has already been in place for almost a decade now, where expensive goods or small items that can be hidden or misplaced easily are tagged and RFID readers (placed at entrance/exit doors) alert the retailer if an item leaves the store without being already paid for.

SUMMARY

According to an aspect of the present invention, a method is provided for implementing a radio frequency identifier (RFID) system. The method includes transmitting, by an RFID interrogator with multiple antennas, an RF signal. The method includes receiving a superimposed received signal. The superimposed received signal includes replies from a first RFID tag and a second RFID tag that are overlapping in time. The method also includes separating the replies from the first RFID tag and second RFID tag though spatial processing of the superimposed received signal.

According to another aspect of the present invention, a method is provided for implementing a radio frequency identifier (RFID) system. The method includes perturbing a transmitted wave. The wave is transmitted by an RF interrogator. The method includes generating a quasi-static process for a stationary period. The stationary period is at least a time required to excite an RFID tag, receive a message from the RF interrogator and finish the reply by the RFID tag. The method further includes generating different average energy at the RFID tag in different stationary period within a given reading cycle by the RF interrogator. The given reading cycle includes multiple stationary periods.

According to another aspect of the present invention, a system is provided for implementing a radio frequency identifier (RFID) system. The system includes a processor device operatively coupled to a memory device, the processor device being configured to transmit a radio frequency (RF) signal, by an RFID interrogator with multiple antennas. The processor device also receives a superimposed received signal. The superimposed received signal includes replies from a first RFID tag and a second RFID tag that are overlapping in time. The processor device also separates the replies from the first RFID tag and second RFID tag though spatial processing of the superimposed received signal.

According to another aspect of the present invention, a system is provided for implementing a radio frequency identifier (RFID) system. The system includes a processor device operatively coupled to a memory device, the processor device being configured to perturb a transmitted wave. The wave is transmitted by an RF interrogator. The processor device generates a quasi-static process for a stationary period. The stationary period is at least a time required to excite an RFID tag, receive a message from the RF interrogator and finish the reply by the RFID tag. The processor device further generates different average energy at the RFID tag in different stationary period within a given reading cycle by the RF interrogator. The given reading cycle includes multiple stationary periods.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
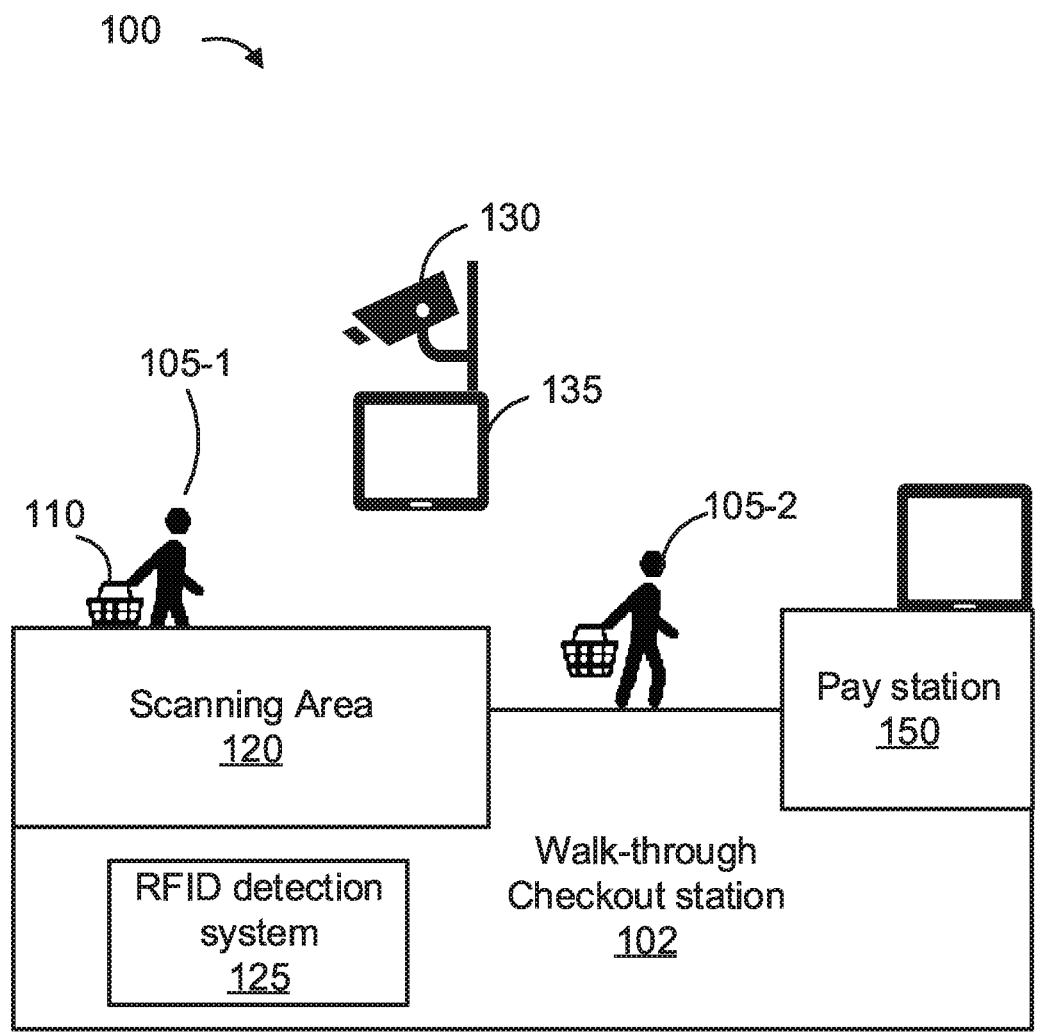
FIG. 1 is a block diagram illustrating a walk-through checkout station, in accordance with the present invention.

In accordance with embodiments of the present invention, systems and methods are provided to/for implementing a walk-through checkout station that includes a radio frequency identifier (RFID) interrogator with multiple antennas. The RFID interrogator can excite multiple RFID tags by transmitting signals from the interrogator, receiving replies from RFID tags that are overlapping in time and separating the replies from RFID tags though spatial processing of the superimposed received signal.

In one embodiment, the transmitted wave is perturbed by the RFID interrogator to generate a quasi-static process where the stationary period is at least the time required to excite an RFID tag. Messages are then received by the RFID tag from the interrogator and a reply is sent by the same RFID tag, generating different average energy at the RFID tag in different stationary period within a given reading cycle by RFID interrogator. The reading cycle includes multiple stationary periods.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a block diagram illustrating a walk-through checkout station system 100 is provided, in accordance with example embodiments.

As shown, FIG. 1 illustrates a walk-through checkout station system 100 in which a checkout process can be completed using a walk-through checkout station 102 (for example, lane, etc.) based on RFID technology in accordance with example embodiments described herein. Walk-through checkout station 102 includes a scanning area 120, and a pay station 150. The scanning area 120 includes (or is connected to, wired or wirelessly) an RFID detection system 125 and can include cameras 130 positioned to perform facial recognition through facial matching. A person (illustrated as persons 105-1 and 105-2) can take a basket (illustrated as baskets 110-1 and 110-2) into the scanning area 120, with items (that include RFID tags) to be purchased being listed on a display 135 after RFID detection by RFID detection system 125. In some embodiments, the scanning area 120 can include a shielded returns section in which items are removed from the area and from the total (for example, by a conveyor belt, not shown). The person can then proceed to the pay station 150.

In example embodiments described herein, the RFID detection system 125 can read the correct RFID tag (not individually shown in FIG. 1) corresponding to an item in the basket 110 in presence of other RFID tags which may include RFID tags that are not to be read as the price tag for an item and are used for different purposes, such as theft prevention, inventory, etc.). RFID detection system 125 can read the RFID tag without the need to locate the RFID tag, or correctly place it, for example horizontally or flat on the surface. RFID detection system 125 can read multiple tags at a time or in a very short interval. RFID detection system 125 can also trace an item (based on an RFID tag), for example a particular shirt from a set of shirts that have the same size, fabric, color, pattern, etc., to its time of checkout and corresponding customer (for example, basket 110). RFID detection system 125 can minimize the possibility of error (for example, in skipping an item, etc.) at the time of scanning.

Walk-through checkout station system 100 can include one or more areas defined as tunnels (or lanes), where the presence of an RFID tag can be distinguished in any of these areas. As described herein, a tunnel refers to a three-dimensional (3D) volume. A tunnel can be separated from the rest of the 3D volume by a boundary where the boundary is a connected surface (for example, a physical boundary). Part of the boundary may be marked by actual objects such as wall, doors, etc., where some other parts may remain open and considered to be a virtual boundary.

Walk-through checkout station system 100 can include tunnels designed to use multiple antennas and a combination of the received signal from those antennas. In example embodiments, walk-through checkout station system 100 can accommodate the use of RF absorbers, and RF reflectors (not shown in FIG. 1) to facilitate the shaping of such tunnels. RFID detection system 125 can use a combination of received signal from different antennas along with their characteristics such as received signal strength indictor (RSSI), phase, doppler, etc., can be used to infer possible position of the RFID tags. RFID detection system 125 can observe such readings of the RFID tag by different antennas over time (e.g., number of readings, time between readings, etc.) to improve the efficiency of the classifying process.

Figure 2:
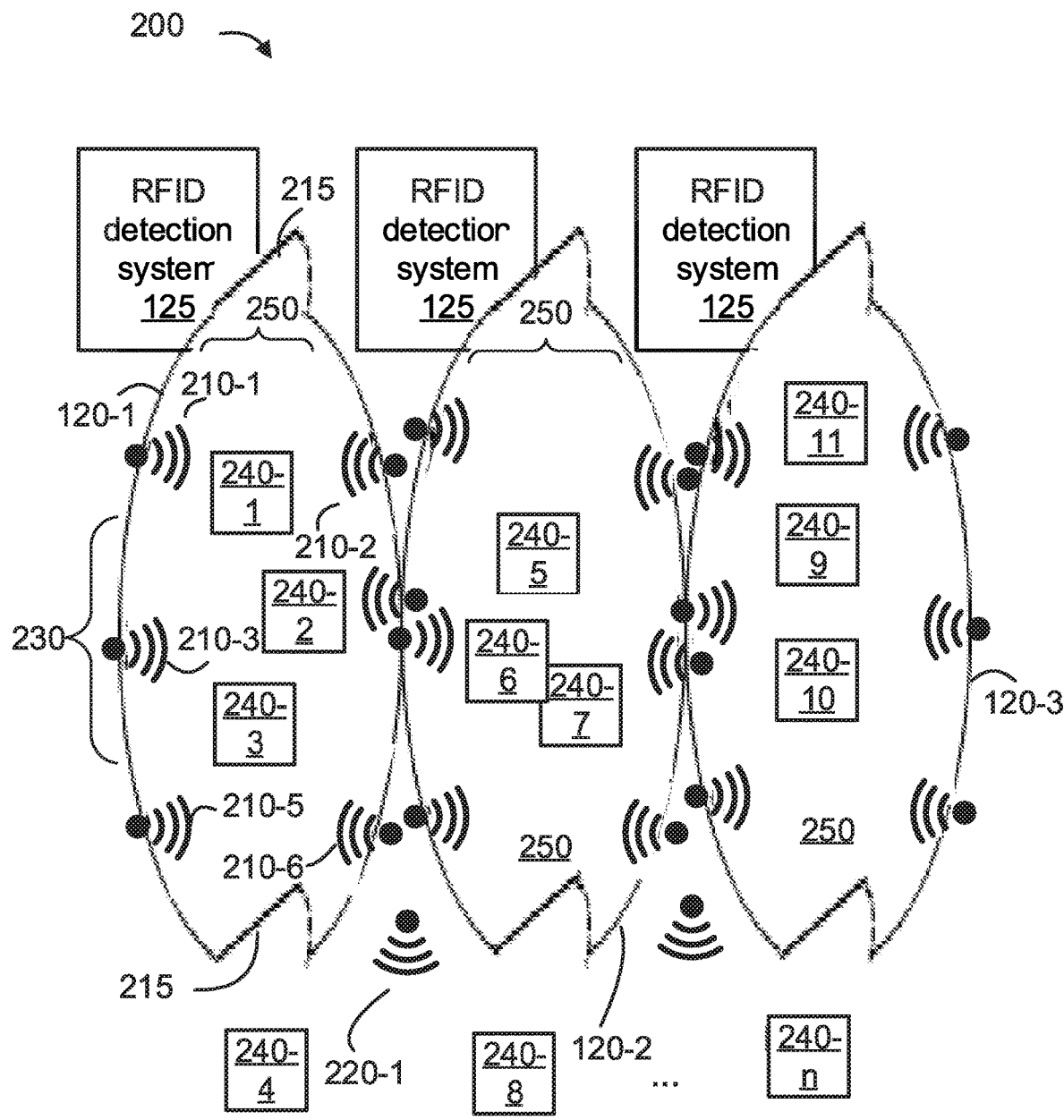
FIG. 2 is a block diagram illustrating a top down view of multiple walk-through checkout stations, in accordance with the present invention.

Referring now to FIG. 2, a top view of an enhanced multi-lane walk-through checkout station is provided, in accordance with example embodiments.

As shown in FIG. 2, an enhanced multi-lane walk-through checkout station 200 (top view) includes antennas 205 deployed at the sides of each scanning area 120 (shown as 120-1 to 120-3 for three adjacent walk-through checkout station systems 100, by way of example). The walk-through checkout station systems 100 can include inside RF antenna (210) placements, doors 215, outside RF antenna (220) placements and lane curvature 230 to enhance the inside coverage and attenuate the RF signals that escape the scanning area 120 (for example, a checkout area). In example embodiments, customers (not shown in FIG. 2) can walk through a scanning area 120 of a particular walk-through checkout station systems 100 and the RFID tags 240 (shown, by way of example as 240-1 to 240-n) are read and charged into an account associated with the customer.

As shown in FIG. 2, multiple RFID tags 240 can be positioned in a checkout tunnel 250 that includes RF antennas 210 of an RFID reader associated with RFID detection system 125. In some embodiments RFID detection system 125 can include one or more radio frequency (RF) reflectors and/or RF absorbers (not individually shown). The RFID detection system 125 implemented with RFID tags 240 bring advantages into automation of the checkout process as well as the store management. Since RFID tags 240 are read wirelessly, there is no need to locate and present the RFID tag 240 in a specific way to the RFID reader (or interrogator) antenna. Further, multiple RFID tags 240) can be scanned at (for example, substantially) the same time by having them in the scanning area 120 at once. The RFID detection system 125 reduces the possibility of human error by limiting reading of RFID tags 240 to those in the scanning area 120 and reading directly without a person presenting the RFID tag 240 to a reader as is the case in barcode systems. Hence, it is not possible to present a different (wrong) RFID tag 240, or not to scan the RFID tag 240, or scan an RFID tag 240 twice or more in error. RFID tags 240 can mark each item with a unique ID (as opposed to a common ID used for the same item type in barcodes). Hence, it is easier to know exactly which item is sold and adjust the price of a similar item differently than others, for example, for a distressed or open-box merchandise.

The example embodiments provide a system in which one or more areas are defined as (checkout) tunnels 250 (formed in the scanning area 120) and distinguish the presence of an RFID tag 240 in these areas. The checkout tunnels 250 refer to a defined 3D volume (that can be defined as a portion of a particular open space or three-dimensional volume, as opposed to a closed underground space). A checkout tunnel 250 is separated from the rest of the three-dimensional volume by its boundary (for example, where the boundary is a connected surface). Part (or all) of the boundary may be marked by actual objects such as wall, doors, etc. where some other part (or, in some embodiments, all) may remain open and considered to be a virtual boundary.

A session can be defined as a four-dimensional (4D) section marked by a limited time interval in a particular tunnel 250. RFID detection system 125 identifies RFID tags 240 accurately that are in different sessions. In other words, RFID detection system 125 identifies the presence of an RFID tag 140 within a tunnel 250 in a particular time interval. Although multiple sessions may overlap over some time interval (e.g., two customers being in adjacent tunnels (for example, within scanning area 120-1 and 120-2 holding items) RFID detection system 125 can correctly assign each of the RFID tags 240 to each session. RFID detection system 125 handles possible interference from different antennas in a way that these sessions are separable.

FIG. 2 shows a walk-through checkout system that consists of three adjacent lanes (for example, three walk-through checkout station systems 100). According to example embodiments, the length of each lane can be approximately 2 meters and the width, and the heights can be both approximately 1 meter. In the illustrated example, there are three antennas 210 at each side per lane (or scanning area 120) that account for a total of 6 antennas per lane (for example, antennas 210-1 to 210-6 in scanning area 120-1). In other embodiments there can be any number (greater than one) of antennas.

RFID detection system 125 performs separation of each tunnel within a three-dimensional space in addition to implementing multi-session detection. RFID detection system 125 can implement processes to identify each RFID tag 240 that is placed within the session (scanning area 120) and nothing else. RFID detection system 125 handles possible tags in vicinity of the tunnel 250 (for example, RFID tag 240-4 with respect to scanning area 120-1 (and the checkout tunnel 250 formed within)) such that tags outside of the tunnel 250 are considered out of the session. RFID detection system 125 can also logically and/or physically separate two different session that are running back to back on the same tunnel 250 (and consequently produce meaningful results).

Example embodiments accommodate the use of RF absorbers, and RF reflectors (not individually shown in FIG. 2) to facilitate the shaping of such tunnels 250. According to example embodiments, the received signal from different antennas 210 can be combined along with their characteristics such as received signal strength indicator (RSSI), phase, doppler, etc. and used to infer possible position of the RFID tag 240. Additionally, RFID detection system 125 can observe such readings of the RFID tags 240 by different antennas 210 over time to improve the efficiency.

The walk-through checkout station systems 100 is designed to account for the possible availability of wandering RFID tags 240 (such as 240-4 in the instance of scanning area 120-1) around the checkout area and make sure that those RFID tags 240 can be identified as outside tags. In general, if the RFID tags 240 are not read at all these tags are considered outside tags. However, the RFID tags 240 that are in close proximity of the tunnel 250 have a chance to be read by one or some of the antennas 210. RFID detection system 125 identifies these tags as outside tags through a smart detection process. In addition, the physical structure and design of the walk-through checkout station systems 100 also enhances such detection (and differentiation).

RFID detection system 125 is designed with a high read efficiency and coverage of the antenna system to guarantee that RFID tags 240 that are in the checkout area are read. The time that it takes for the system to identify the tags that are inside highly depends on the number of antennas 210, the antenna placement, the process that controls the transmission of the RF signals through multiple antennas 210, the physical structure of the checkout lanes (for example, lane curvature 230), and the placement of the reflectors and absorbers within the checkout structure.

In example embodiments, RFID detection system 125 can correctly separate and identify the RFID tags 240 in each lane of multiple adjacent lanes (for example, scanning areas 120-1 to 120-3). RFID detection system 125 can correctly separate and identify the tags in sessions in different lanes including in instances in which sessions start and end at different time. RFID detection system 125 identifies the RFID tags 240 while accounting for the presence of another customer (and hence RFID tags 240 for that customer that do not belong to the session) in an adjacent lane.

Further, the structure of the walk-through checkout station systems 100 is designed to significantly improve the time that it takes to finish the readings in each session. The lane curvature 230 enhances the walk-through checkout station systems 100 in multiple ways. The lane curvature 230 works in a similar manner to an optical lens (as described in the field of optics) by reflecting back the signals within the scanning area 120. The two curved walls (lane curvature 230) in both sides can reflect most of the RF signals transmitted from each antenna 210 several times and generate a full and rich coverage within the checkout lane. Additionally, the same lane curvature 230 causes less RF signal to be able to escape the checkout lane even when the doors 215 are open or if no door 215 is used. This compensates (or accounts for) different customers entering or exiting different lanes and instances in which some outside RFID tags 240 may be read by the RFID detection system 125 when a door 215 is open.

Figure 3:
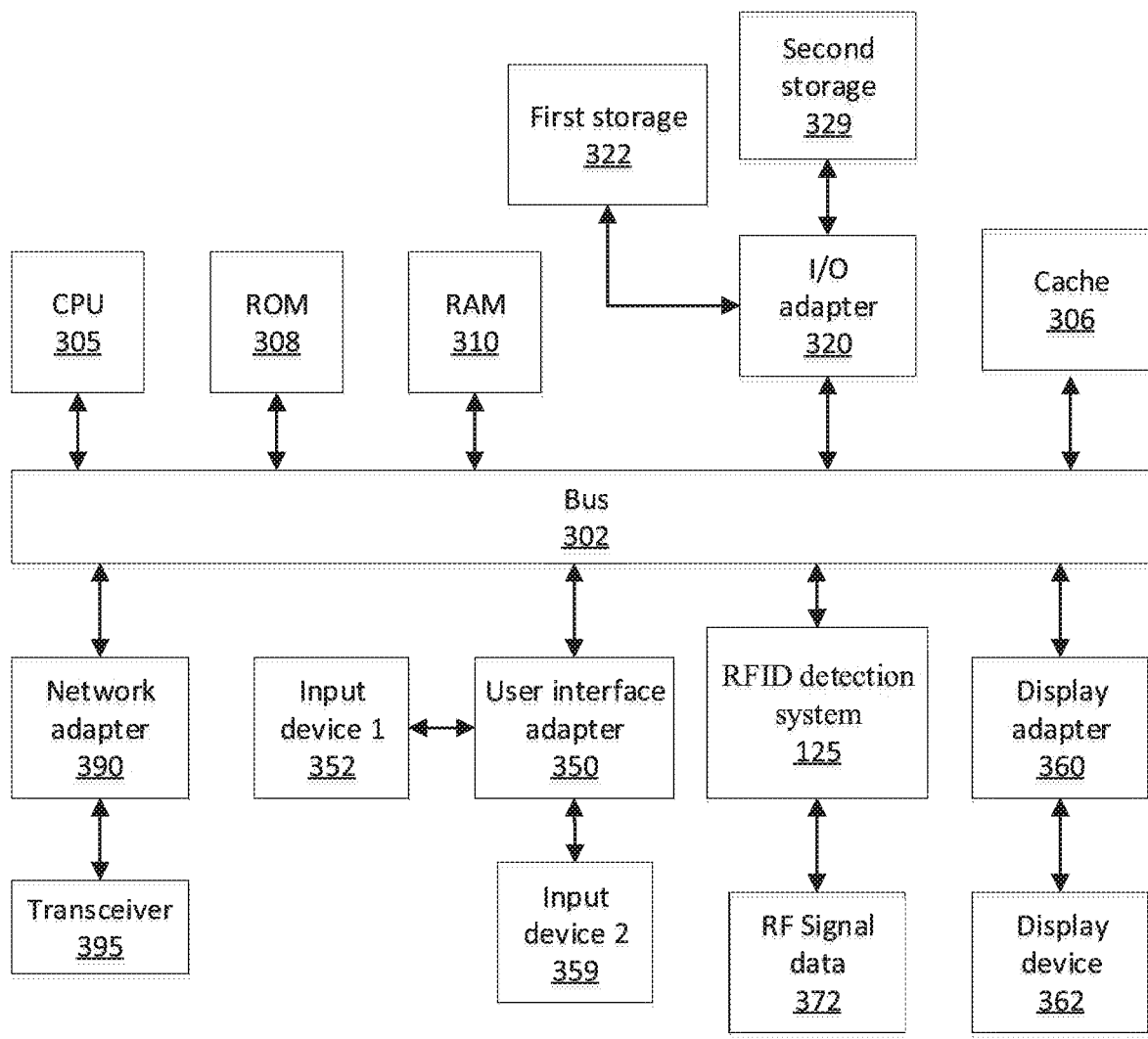
FIG. 3 is a block diagram illustrating a high-level system for implementing a walk-through gate, in accordance with the present invention.

Referring now to FIG. 3, a high-level system for implementing a walk-through gate is illustratively depicted in accordance with an embodiment of the present invention.

Exemplary computer system (e.g., a server or a network device) for implementing a walk-through gate with signal separation is shown in accordance with an embodiment of the present invention. The computer system 300 includes at least one processing device (CPU) 305 operatively coupled to other components via a system bus 302. A cache 306, a Read Only Memory (ROM) 308, a Random-Access Memory (RAM) 210, an input/output (I/O) adapter 320, a network adapter 390, a user interface adapter 350, an RFID detection system 125, and a display adapter 360, can be operatively coupled to the system bus 302.

A first storage device 322 and a second storage device 329 can be operatively coupled to system bus 302 by the I/O adapter 320. The storage devices 322 and 329 can be any of a disk storage device (e.g., a magnetic or optical disk storage device), a solid-state magnetic device, and so forth. The storage devices 322 and 329 can be the same type of storage device or different types of storage devices. Either or both of the storage devices 322 and 329 can be configured to operate as a data store or database to store various logs of RF signal data 372 (e.g., signal measurements from various portions of the walk-through checkout station systems 100). The RFID detection system 125 can include software and/or hardware as described herein below.

A transceiver 395 can be operatively coupled to system bus 302 by network adapter 390. A display device 362 is operatively coupled to system bus 302 by display adapter 360. RFID (reader, or interrogator) data 372 can be operatively coupled to system bus 302 directly or indirectly, for example via RFID detection system 125. The RFID detection system 125 can be configured to receive RF signal data 372.

A first user input device 352 and a second user input device 359 can be operatively coupled to system bus 302 by user interface adapter 350. The user input devices 352 and 359 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used in accordance with the present invention. The user input devices 352 and 359 can be the same type of user input device or different types of user input devices. The user input devices 352 and 359 can be used to input and output information to and from system 300.

Other embodiments of the present invention can optionally include further processing units including a graphics processing unit ("GPU"), a mother board, or alternatively/additionally another storage medium, an operating system, one or more application software, as well as including one or more communication interfaces (e.g., RS232, Ethernet, Wi-Fi, Bluetooth, USB). Useful examples of computing devices optionally included in or integrable with embodiments of the present invention include, but are not limited to, personal computers, smart phones, laptops, mobile computing devices, tablet PCs, and servers. In accordance with embodiments of the present invention, an event record log source can be a computer storage medium.

Of course, the computer system 300 can also include other elements (not shown), as readily contemplated by one of skill in the art, as well as omit certain elements. For example, various other input devices and/or output devices can be included in computer system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 300 are readily contemplated by one of ordinary skill in the art given the teachings of the present invention provided herein.

It should be understood that multiple computing devices can be operably linked to form a computer network in a manner as to distribute and share one or more resources, such as clustered computing devices and server banks/farms. In embodiments of the present invention each of the aforementioned elements (e.g., device, medium, source, or module) can be directly or indirectly communicably connected (e.g., via a wireless a wired electronic connection) to at least one other element of the system. As described in more detail below, some embodiments of the present invention can be wholly contained within a single computing device. Other embodiments, however, can encompass a plurality of interconnected or networked devices and resources.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 4:
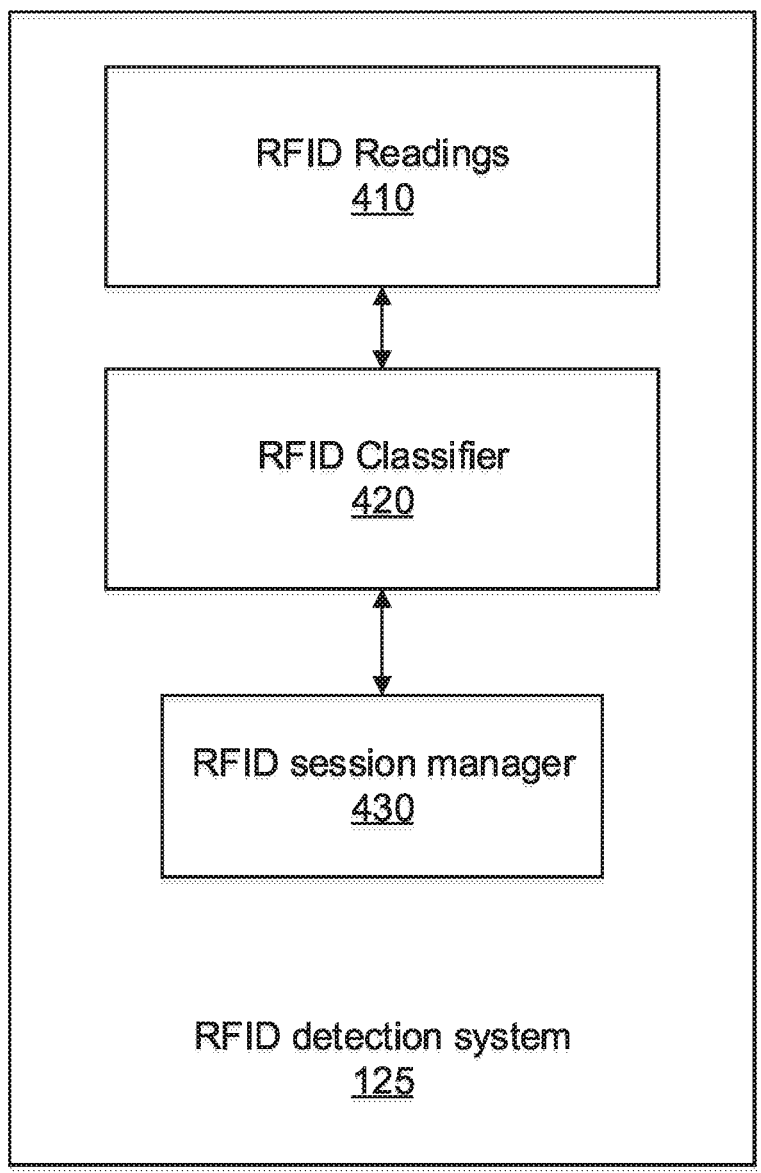
FIG. 4 is a block diagram illustrating a high-level radio frequency identifier (RFID) detection system, in accordance with the present invention.

Referring now to FIG. 4, a block diagram of a high-level RFID detection system 125 is illustratively depicted, in accordance with example embodiments of the present invention.

As shown in FIG. 4, RFID detection system 125 includes RFID readings 410, received from RFID tags 240 within a tunnel 250 (as described with respect to FIG. 2) and from other lanes and outside the tunnels 250. RFID detection system 125 also includes an RFID classifier 420, that classifies RFID tags 240 as belonging to a particular tunnel 250, other tunnels 250 or outside of the tunnels 250, and an RFID session manager, that manages time windows. The ensuing discussion can be further understood with reference to FIG. 2, by way of example.

The coverage and RFID readings 410 of the entire volume inside a checkout lane (scanning area 120) is partially determined by physical design of the system. In some instances, the structure can generate RFID readings 410 from unwanted RFID tags 240. The probability of (and sensitivity to) unwanted RFID readings 410 increases when power increases or other techniques are performed to generate a full covered area inside the checkout lane. RFID classifier 420 can eliminate (for example, some of) these unwanted readings from outside RFID tags 240 and/or tags that belong to an adjacent tunnel (250) or lane.

In general, the reading of an RFID tag 240 at any particular location and given orientation is a probabilistic phenomenon. Hence, the process of interrogating an RFID tag 240 can be analyzed as a communication channel where transmission from different antennas (including antennas 210 in the tunnels 250) are interpreted as transmission of different symbols as an input to a channel and the response from the tag is considered a sequence of binary output; '1' for positive response and '0' for no response. The probability of 0 and 1 in the output would be a function of the transmitted symbol, i.e., the transmitted antenna and chosen power.

RFID classifier 420 can further model the channel as a mixture Gaussian distribution instead of discrete memoryless channel where the received RSSI for each transmitted symbol has a Gaussian distribution and depends on the transmitted symbols as well as the transmit power.

RFID classifier 420 can identify if the RFID tag 240 is in a particular location based on identifying which channel is more likely to generate an output sequence based on a known transmit codeword of the symbols. This can be done based on joint typicality between the transmit and receive sequence. Identifying the tag location can also be interpreted in relation to the problem of 'identification via channel' where RFID classifier 420 would determine if a particular codeword was transmitted rather than what codeword was transmitted.

In example embodiments, RFID classifier 420 determines the location of the RFID tag 240 in a manner that approximates the joint typical decoding in a suboptimal form (for example, to speed up the decision-making process). Each reading of an RFID tag 240 from a particular antenna 210 would receive a positive or negative metric. A given RFID tag's 240 metric can be calculated for each lane as well as the outside region. The metric is dependent on which lane (for example, tunnel 250) the metric is being computed for, and also depends on the antenna port number as well as other reading parameters such as RSSI, etc. The metric is then positively or negatively combined for all the readings within a time window.

RFID session manager 430 can determine the time window to have a minimum duration to ensure that RFID classifier 420 can have enough confidence that every RFID tag 240 inside the checkout region is read at least one time. RFID classifier 420 then uses a sequential detection process. The process continues until every RFID tag 240 that has been read during the session by one of the inside antennas 210 within the tunnel 250 are decided. In this instance, a decision means that RFID classifier 420 has identified the RFID tags 240 to be inside this lane, in another lane or in an outside area.

At each time slot and after updating a metric, RFID classifier 420 checks if any particular RFID tag 240 within the list of a lane can be claimed by this lane, another lane or outside area. In some embodiments, RFID detection system 125 can receive RFID tag 240 signal measurements (RFID readings 410) from outside lanes in a multilane system. The claim process is based on the computed metrics and comparison with a threshold. Note that in some corner cases, two lanes may potentially be able to claim a tag in a given time slot. In such situation, the process can pick the lane which has the largest difference with its corresponding threshold.

According to example embodiments, RFID session manager 430 may implement a maximum delay for the time window where the decision for a particular lane has to be made. Since the sequential detection may not reach a decision by the end of the maximum delay time, at this time RFID classifier 420 uses a truncated sequential detection process where a single threshold is used to make a final decision. Regardless of the truncated sequential detection process, this final threshold can be implemented towards the optimization of the precision performance.

This means that RFID classifier 420 may value more a decision that is right about not assigning an item from outside the checkout lane to this lane. However, these decision criteria may perform poorly in recall performance. RFID classifier 420 may also drop some of the RFID readings 410 from the RFID tags 240 that are inside the checkout lane because RFID classifier 420 is not sure enough about those RFID tags 240 (for example, a confidence level is below a predetermined threshold).

Figure 5:
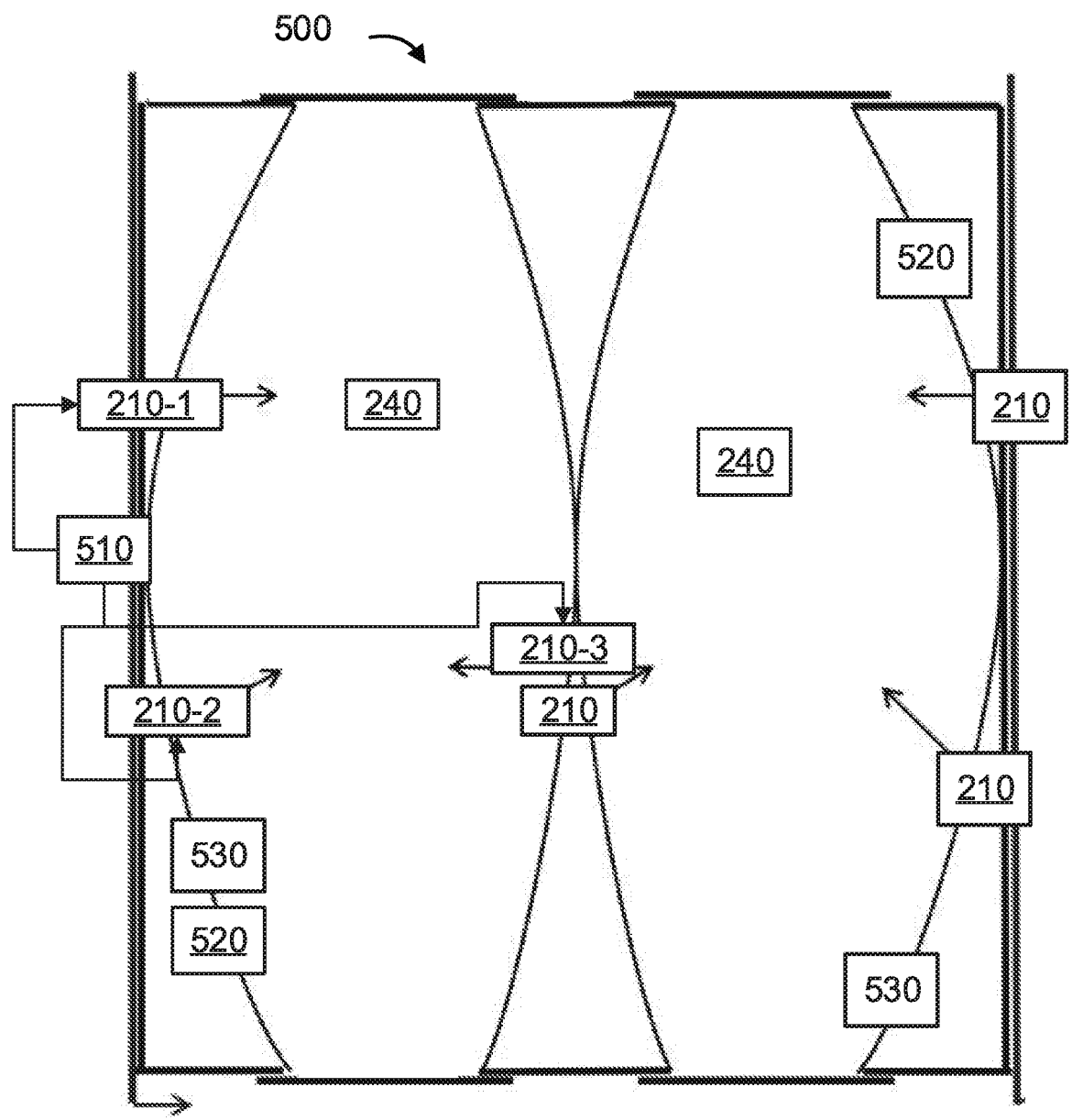
FIG. 5 is a block diagram illustrating a scenario for reading RFID tags using multiple antennas, in accordance with the present invention.

Referring now to FIG. 5, a scenario 500 for reading RFID tags using multiple antennas is illustratively depicted in accordance with an embodiment of the present invention.

As shown in FIG. 5, multiple scanning areas 120 can be fabricated from panels, including from a flexible material, such as plywood, that will not break while bent to create the curved areas. Multi antenna systems (for example, including multiple antennas 210) can be used to detect RFID tags 240 (for example, in retail systems), however, the appearance of very low energy points (for example, NULL points, as further described herein below with respect to FIG. 6) within the fields of antennas can stymie the effectiveness of multi antenna configurations. The scanning areas can include RF reflectors 520 and RF absorbers 530.

According to example embodiments, the multiple antennas 210 can be used in designing RFID interrogators 510 or RFID systems that use such RFID interrogators 510. Multiple antennas 210 can be used in an instance in which an RFID interrogator 510 has multiple ports that are working in time division duplex (TDD) mode or in frequency division duplex (FDD) mode and each port is potentially connected to a different antenna 210. In some cases, a single port can be broken down into multiple sub-ports that operate in TDD mode as well. In other instances, the multiple antennas 210 can be used as phased array antennas to steer the physical beam in particular direction(s) or scan a 3D volume by using multiple beams consecutively in time.

According to example embodiments, RFID interrogators 510 can be implemented for simultaneous multi-tag reading in a single frequency or multiple frequencies. RFID interrogators 510 can thereby mitigate or account for the collision problem in the areas that there are many RFID tags 240 around. By reducing the effects of collisions, RFID interrogators 510 can increase the read rates of the RFID tags 240 and also addresses (or eliminates) the problem of "deserted tags" which happens when some RFID tags 240 can never be heard or have a chance to reply due to the interaction of multiple RFID tags 240 in their proximity.

The multiple antennas 210 can be deployed in order to generate different directions at different points since the orientation of the RFID tags 240 in many applications is an unknown variable (for example, dependent on the placement of the RFID tag 240 by the customer). The lower the projection of the incident vector from the RFID antennas 210 to the plane of the RFID tag 240, the better the reading, which means that the orthogonal incident vector that has zero projection is the ideal case, and the parallel incident vector to the plane of the tag is the least desired.

Figure 6:
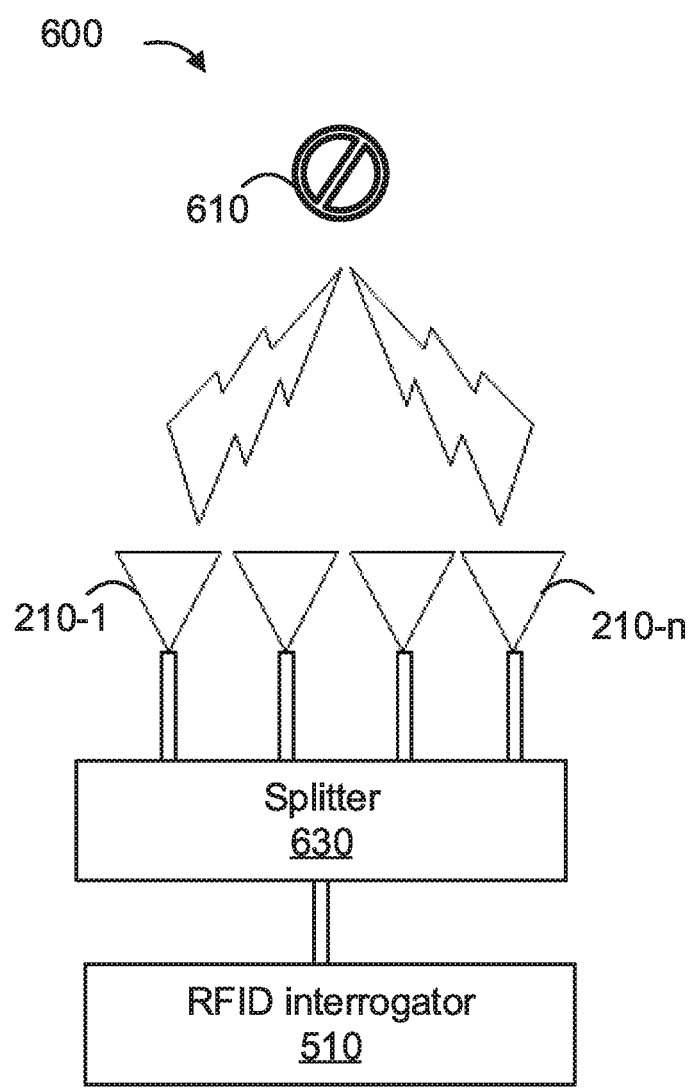
FIG. 6 is a block diagram illustrating a scenario of null points due to using multiple antennas, in accordance with the present invention.

Referring now to FIG. 6, a scenario 600 of null points due to using multiple antennas is illustratively depicted in accordance with an embodiment of the present invention.

As shown in FIG. 6, low energy points (named NULL points 610) can be generated (by multiple antennas, for example, antennas 210-1 to 210-$n$) within the field of an RFID interrogator 510 (for example, that includes multiple antennas 210 with a splitter 630) especially in the near field and hence make the RFID tags 240 unreadable when placed in such NULL points 610. The orientation of the RFID tags 240, the use of multiple antennas 210 to increase the coverage, and the use of multiple antennas 210 combined with precoding for simultaneous readings of multiple tags are leading factors in generation of NULL points 610.

According to example embodiments, RFID interrogator 510 can implement multi-tag reading for simultaneous reading of multiple RFID tags 240. RFID interrogator 510 can only read one tag at a time. If multiple RFID tags 240 are interrogated the simultaneous or even partial overlapping response from multiple RFID tags 240 would result in a collision which makes the multiple RFID tags 240 unreadable. To this end, a random timer can be used by the excited RFID tags 240 to determine when to respond. This alleviates the problem to an extent if the number of simultaneously excited tags is low. However, for areas with large tag population the overlapping response from multiple RFID tags 240 would be unavoidable which can result in a severe loss in reading performance.

RFID interrogator 510 can exploit multiple antennas to separate responses from the tags that are reasonably far apart in a signal domain. The spatial separation of the tags usually makes then separable in the signal domains as well, however such spatial separation is not always necessary. The signal received from an RFID tag 240 by multiple antennas 210 (for example 210-1 to 210-$n$) can be combined in a way that the response from the RFID tags 240 are separated in the signal domain. For example, a unitary processing of the received signals, such as described below, provides a framework that can be extrapolated to more complex cases.

Let U be a N×N unitary matrix used to process the vector of the received signals y by N antennas. The processed vector $\tilde{y}=Uy$ consists of two orthogonal views of the received signal y. If the channel from the RFID tag 240 to the receive antennas 210 at the RFID interrogator 510 is modeled as H then the received vector y is given by $y=Hx+z$ where x is the vector of the transmitted signal vector from the tags, and z is additive noise. If the channel H itself has two orthogonal columns then using $U=H^H$, where $H^H$ is the conjugate transpose of H decomposes the received signal into two orthogonal components.

In some instances, the columns of the channel matrix H are not necessarily orthogonal but could be close to orthogonal. Nonetheless, even in the presence of much more pronounced correlation between the channels of different tags, RFID interrogator 510 can improve the interference of other tags from a given tag by using a preprocessing where the matrix U is not unitary matrix. The correlation between the channels of a given RFID tag 240 to that of different tags in a multiple antenna receiver is closely related to the projections of the corresponding columns of the channel matrix. RFID interrogator 510 can use the multiple antennas 210 for the purpose of simultaneous multi-tag reading.

The reading performance of the RFID tags 240 can be considerably affected by the orientations of the RFID tags 240. RFID tags 240 can include a chip that processes the received signal and by changing the impedance of its port, which is connected to the antenna, modulates the backscattered signal. RFID tags 240 can also include an antenna (for example, a planar antenna that consists of one or multiple loops). The antenna of the RFID tag 240 can be designed to have particular impedance. The antenna of the RFID tag 240 absorbs power in order to power up the chip and also to reflect the backscatter signal.

In different orientations of RFID tags 240, the power that is absorbed by the antenna as well as the power of the backscattered signal at the receiver considerably varies. This can cause some RFID tags 240 to be unreadable even when they are in close proximity to the antennas 210 (for example, about a meter away). The power absorbed by the tag antenna may be maximized when the incident wave is normal (or orthogonal) to the plane of the tag antenna. The direction of the electric field of the radiated wave with respect to the antenna at the incident point generates current in the conductive surface of the antenna.

The example systems described herein can vary the direction of the electric field of the transmitted wave with respect to time at the points in the space where RFID interrogator 510 reads the RFID tags 240. In the far field, RFID interrogator 510 can use circular polarization or perturbation to read the RFID tags 240. RFID interrogator 510 can implement perturbation to generate signals that fluctuates at the receiving antenna (of the RFID tags 240) in such a way that the fluctuating signals induces energy in the antenna more homogenously and irrespective of its orientation.

RFID interrogator 510 can implement perturbation to provide higher energy in (almost) all directions to the RFID tags 240. This can be interpreted as having higher induced energy at a time fraction that is enough to power up the tag and gather its replies for almost all orientation of the RFID tag 240 when it is placed at a given point.

Therefore, the difference between the time scale for perturbation and the time scale in which the particular symbol is transmitted to or received from the tag is an essential factor. RFID interrogator 510 can implement the perturbation time scale to be at least in the order of the (largest) transmission packet to an RFID tag 240, which is equivalent to the transmission time required by an RFID interrogator 510 to make an RFID tag 240 wake up, process, and send a reply for an inquiry.

Perturbation can be viewed as a quasi-stationary process where its time scale cannot be too short or too long. If the time scale is too short the perturbation is not effective as it will not cause the receiving antenna (for example, at the RFID tag 240) to gather enough energy to read, and if the time scale is too long the effective receive average power at the receiving antenna would not change since the received wave only varies with the modulated data. However, by controlling the time scale of the perturbation, RFID interrogator 510 can control the average power induced at the receiving antenna.

For example if the time required for exciting the RFID tag 240, transmitting the data to the tag, and receiving the backscattered data from the RFID tag 240 is $T_{tag}$ seconds, RFID interrogator 510 can implement the time scale of perturbation to be in the same order, e.g., $kT_{tag}$ for some natural number k, say k=2. On the other hand, if the time that the RFID tag 240 is supposed to be read is $T_{interrogation}$ this time scale is usually orders of magnitude larger, say $T_{interrogation} \sim 100 T_{tag}$ which means that the perturbation process generates several different wave patterns in $T_{interrogation}$. Since, one expect the reading process to be completed in $T_{interrogation}$ effectively the max energy that can be induced to the RFID tag 240 in any of the perturbation cycles is considered as the reading power for the RFID tag 240.

According to example embodiments, the systems can satisfy the conditions based on mechanical movements of the antennas or an RF reflecting body in proximity of the antennas or in any paths (not necessarily direct path or line-of-sight) between an RFID interrogator 510 and the RFID tag 240. Even slight shaking of the antenna (at the interrogator or the tag) can cause the RFID tag 240 to be readable due to the fact that such mechanical movement even at high speed is usually considered a quasi-stationary process in comparison to the time scale of a symbol transmission in the form of an electrical signal. On the other hand, RFID interrogator 510 and the RFID tag 240 can make such movement=fast enough to span many changes during $T_{interrogation}$ that could be in the order of a second or tenth of a second. The design of perturbation in electrical signal domain has to be such that it satisfies the aforementioned condition.

To enhance the coverage area of reading RFID tags 240, RFID interrogator 510 uses multiple antennas 210. The multiple antennas 210 can form an array such as a phased array antenna and connect to a single port or may be used to connect to different ports. A port for an RFID interrogator 510 can be defined as an antenna connection which is polled in a combination of time division duplex (TDD) and frequency division duplex (FDD) fashion. This combination could mean that the ports are polled in TDD mode and, within the time allocated to an individual port, multiple frequencies may be used in succession. RFID interrogator 510 can also use a combination of ports simultaneously active but in different frequencies.

When multiple antennas 210 are active in the same frequency band, regardless of having them connected to a single antenna port (e.g., as a phased array antennas) or to multiple antenna ports, their interference pattern would have some NULL point 610. A NULL point 610 is a volume where the RFID tag 240 is not readable. This does not mean that the sum of the interfering signals from different antennas 210 or reflectors 520 are necessarily zero. This only means that the induced power into RFID tag 240 is below the threshold to activate it or its reply is weak such that it cannot be decoded as it may have received by the RFID interrogator's 510 antenna. Note that the definition of the NULL point 610 can be sensitive to the type of RFID tag 240 used or the orientation of the RFID tag 240.

The NULL point 610 may in fact arise even if only a single port is active. The combination of the same band transmission from multiple antennas 210 as well as the reflections of the signal from the surrounding environment together constitute the formation of a NULL point 610. Such NULL points 610 in the near field of the antennas 210 are more prominent specifically when the antennas 210 are placed far apart, (e.g., to cover a particular volume such as a cube, one may place multiple antennas 210 at multiple sides of the cube looking toward inside of the cube). Therefore, by adding antennas to the system to increase coverage, the system can cause unwanted NULL points in the same volume at the points that already had coverage.

RFID interrogator 510 can implement perturbation to combat low energy points in the field of an RFID interrogator 510. Perturbation of the reading field of a reader (for example, RFID interrogator 510) at a receiving antenna (e.g., the antenna of a tag) can be defined as a changing, in a quasi-stationary fashion, the directions, phase, or amplitude of the travelling waves that affect the receiving antennas to receive powers higher than a threshold in a stationary period of the perturbation process within a given multiples of such stationary periods. The effective reading power of the perturbation in a given location can be defined as the maximum of the received power at the receiving antennas over a stationary period among the overall time spent for reading the RFID tag 240.

Note that the efficiency of a given perturbation method at an individual point can be defined as the ratio of the reading power of the perturbation over the induced power at the receiving antennas without perturbation. The overall efficiency may then be defined as the minimum of the efficiency over all points in the reading region. If the perturbation scheme consist of at least one stationary time period where no signal modification is performed, then the efficiency is always a positive number that is greater than one, which means that such perturbation can only make the reading easier by possibly generating larger average induced power over a stationary period.

RFID interrogator 510 can implement mechanical perturbation of antennas by shaking the antennas. By controlling the shaking of a physical antenna such as patch antenna that is usually used in RFID systems, RFID interrogator 510 can keep almost the same antenna patterns for the main antenna lobe for example, for a 60 degree antenna) while such small shaking of the antennas generates varying phases at each given point. This is because even though the shaking pattern (for example, for a shaking of about 1 to 3 degrees on a given axis that lies on the surface of a patch antenna) does not affect the antenna pattern by much, but the phases of the signal at different directions can be quite different. Moreover, such mechanical shaking may generate different reflections off the surrounding reflecting materials (for example reflector 520).

RFID interrogator 510 can generate perturbation by changing the interference pattern of the signals based on the movement of a reflecting body such as a simple reflector plane (for example, reflector 520) that rotates along an axis. The reflector 520 would not change the phase or gain of the signals that are transmitted from the antenna; however, the reflector 520 generates a varying (both gain and phase) reflecting signal or modifies the gain and phase of other indirect paths from antennas to the RFID tag 240. Hence, this approach can also modify the average signals that is induced in the receiving antenna of the tag over a quasi-stationary period where a packet is transmitted to the tag from the interrogator.

This approach is especially effective where such reflecting body moves closer to the since a small movement of the antenna can generate bigger changes to the interfering signals at the receiving antenna of the RFID tag 240. Moreover, the most effective form of movement is when the axis of the movement is normal (orthogonal) to the ground. In other words, the least effect of the perturbation along a particular axis is in the direction of the axis itself. Hence having a direction that is orthogonal or almost orthogonal to the ground makes such perturbation the most effective in the azimuth direction.

The system can combine (1) mechanical perturbation of the antenna, (2) mechanical perturbation of a reflecting body, and (3) electrical perturbation of antenna feeds, to generate better measurements from the RFID tags 240. With respect to electrical perturbation of antenna feeds, for the sake of clarity of analysis and presentation, the following discussion assumes that the placement of the antennas and their orientation is fixed. The electromagnetic wave at each point may be represented by its electrical field and direction of transmission.

At a given point in the space, referred to herein as v, the electrical field as a result of transmission from antenna $A_i$ located at $u_i$ and pointing in direction ai may be represented as $E(v-u_i, a_i)$. The electric field as a result of transmission from multiple antennas 210 can then be determined as the superposition of all such electric fields for all antennas 210, say i∈S where S is the set of indices of all antennas. Note that there might be reflections from different points denoted by indices j∈T where T is the set of all such points also contribute to the field at location v. Hence, RFID interrogator 510 determines:

$$E(v)=\Sigma_{i\in S}E(v-u_i, a_i)+\Sigma_{j\in T}E(v-u_j, b_j) \qquad \text{Eqn. 1}$$

where $u_j$, j∈T is the location of reflection point j and $b_j$ is the direction of the reflecting wave.

Note that there might be several different reflection direction $b_j$ for a given reflection point due to the fact that multiple different beam may arrive at different directions and reflect back in different direction from the same point. Note further that the number of point in the set T is not necessarily finite, and hence the summation could mean an integration for such cases. RFID interrogator 510 can use an approximation by considering only finite points (even though T might be infinite).

Consider an instance in which a single stream is transmitted through multiple antennas 210 and also consider the case that reflection has negligible effect that can be ignored. The electric field $E(v-u_i, a_i)$ may be written as $w_i x H(v-u_i, a_i)$, where $w_i$ is the complex number that includes the gain and phase of transmitted signal from antenna i. This gain includes the antenna gain as well as the processing gain in the RF chain of this antenna.

The transmitted signal is represented by x and the channel from the antenna to the point v is represented by $H(v-u_i, a_i)$ that explicitly depends on the direction of antenna and the relative position of the receiving point v with respect to the position of the antenna $u_i$. For example if a patch antenna is used the gain of $H(v-u_i, a_i)$ is higher when $v-u_i$, is parallel to $a_i$ and as its angle increases the gain decreases. The phase of $H(v-u_i, a_i)$ also depends on the angle between $v-u_i$, and $a_i$.

In instances in which the vector of $H(v-u_i, a_i)$ for all i is represented as a column vector h and the vector of $w_i$ for all i as a column vector w the received signal at location v is given by $y=h^T w x$ where $h^T$ represents the transpose of a matrix (or vector) h.

The perturbation can be performed on w. One such perturbation could be represented by $$(\tilde{w}) = \frac{\|w\|}{\|w+\delta\|}(w+\delta)$$

where δ is a vector which has random or pseudo-random entries. To limit the effect of perturbation RFID interrogator 510 can force δ to have smaller norm than η‖w‖ for some threshold η. For example, RFID interrogator 510 can use a particular case that the vector δ is picked at random but always has a norm that is equal to η‖w‖. In this case, $$(\tilde{w}) = \frac{1}{1+\eta}\left(w + \frac{\eta\|w\|}{j\|\delta\|}\delta\right).$$

In some cases, RFID interrogator 510 can pick (for example, select, receive, etc.) δ from a given codebook or set instead of being generated at random.

In instances where multiple streams are transmitted at the same times, the transmitted signal is represented as $\Sigma_{k=1}^{N} w_k x_k$ where N represents the number of the streams, $x_k$ represent the transmitted signal for the kth stream and $w_k$ represents the vector of the gains for all antennas i, i∈S. Note that $w_k$ represents a column vector while $w_i$ represents the entry of one of such vector which is the gain (and also including the phase through complex number notation) of antenna i.

Hence, RFID interrogator 510 can determine:

$$y=Wx=\Sigma_{k=1}^{N} w_k x_k \qquad \text{Eqn. 2}$$

where W is a |S|×N matrix composed of column vectors $w_k$ for all streams k=1, . . . , N and x is the vector of the transmitted signals for all the streams. The perturbation works on each stream separately. These perturbations can be represented as $$\tilde{W} = (W+\Delta)\text{diag}\left(\frac{\|w_1\|}{\|w_1+\delta_1\|}, \ldots, \frac{\|w_N\|}{\|w_N+\delta_N\|}\right) \qquad \text{Eqn. 3}$$

where v is a |S|×N matrix composed of column vectors $\delta_k$ for all streams k=1, . . . , N, and $\delta_k$ is the perturbation vector for the stream k. Here diag(.) represents an operator that generates a square matrix with the diagonal elements noted in the argument of the function.

RFID interrogator 510 can change the gain of each stream $x_k$ within the limit of not violating the maximum transmitted power out of an antenna aperture set forth by the respected operating region. Such gain adjustment may be represented by multiplying a matrix $G=\text{diag}(g_1, \ldots, g_N)$ from the right to $\tilde{W}$|, we have $$\hat{W} = (W+\Delta)\text{diag}\left(\frac{\|w_1\|}{\|w_1+\delta_1\|}, \ldots, \frac{\|w_N\|}{\|w_N+\delta_N\|}\right)G. \qquad \text{Eqn. 4}$$

Each antenna in the aforementioned formulation may be a directional antenna, or a multi element antenna such as phased array antenna. The dependency of $H(v-u_i, a_i)$ on $a_i$ incorporates the effect of such individual directional antennas into the respective channel seen by this antenna.

The readings can also be improved based on perturbation of the receiving antenna. The same process of the mechanical or electrical perturbation in the transmitter side as discussed above may be applied in the receiving side as well. However, if the receiving side is not equipped with multiple antenna or is a passive device such as a passive RFID tag 240, then the electrical perturbation of the antenna feeds may not be possible. However, the mechanical perturbation of the receiving antenna can still be performed. In instances where the NULL points 610 are sensitive to the orientation of the receiving antennas 210, perturbation can be used to change the orientation of the RFID tag 240 in favor of a more energy absorbing orientation.

In some instances, increased movement of the receiving antennas can take the RFID tag 240 out of the NULL point 610 and effectively combat the low energy absorption in a NULL point position. The type of movement selected is dependent on the type of application that is being implemented. In many applications, the NULL point 610 is preferably addressed without moving the receiving antenna, e.g., the position and/or orientation of the RFID tags 240. For example, it may not be desirable to ask customers or checkout attendant to move the items in order to make them readable.

RFID interrogator 510 can implement multi-tag reading in RFID systems. Consider multi element antennas. Assume N streams are transmitted by the RFID interrogator 510 using a precoding technique. Even though streams are precoded with different weights and hence they are spatially distinguishable, RFID interrogator 510 can use different frequencies in transmission of at least two different streams.

Such spatial separation makes the RFID tags 240 easier to respond in different frequencies and in the uplink, i.e., when the RF signal is received by the RFID interrogator 510 from multiple RFID tags 240, the RF signal is easier to detect among the signals of multiple RFID tags 240. The received signal model at a given point v is $y_j = h_j^T W x$ where $h_j$ is the channel of the tag j located at $v_j$, W is a $|S| \times N$ matrix composed of column vectors wk for all streams k=1, . . . , N and x is the vector of the transmitted signals for all the streams.

The precoder W can be designed such that the received signal at different tags of interest has a one to one correspondence to different streams while the effect of interference from undesired streams on a tag is minimized. If RFID interrogator 510 selects a subset of users that have orthogonal or close to orthogonal channels $h_j$ then the precoder W may consist of the conjugate transpose of the row vector $h_j^T$, that is a column vector $(h_j^T)^H$ where $(.)^H$ represent the conjugate transpose of (.).

In other cases where the column of W generated by gathering the conjugate transpose of the RFID tag's 240 channels does not have orthogonal column, RFID interrogator 510 can use a pseudo-inverse of W or regularized inverse of W (that is related to minimum mean squared error (MMSE) detection) instead of W itself. The use of zero-forcing precoding or regularized zero-forcing precoding can effectively generate different channels where multiple tags may be read at different channels simultaneously. Once different RFID tags 240 are excited and reply simultaneously, or with overlapping packets, RFID interrogator 510 can distinguish between the replies from different RFID tags 240 at the RFID interrogator 510. RFID interrogator 510 can apply same process of multiuser detection to separate the replies from different RFID tags 240.

RFID interrogator 510 can use the reciprocal of the same zero-forcing or regularized zero-forcing process that was done in the downlink to separate the replies from different tags from the superimposed signal in the uplink (since there is no channel estimation information available). RFID interrogator 510 thereby uses the reciprocity of the channels in the downlink and uplink in the time domain and hence does not need to perform any channel estimation.

According to example embodiments, RFID interrogator 510 can use a beamforming vector for transmission of a stream to an RFID tag 240 can perform the perturbation by modifying the beamforming vector by adding a random vector to the beamforming vector. RFID tag 240 can also perform perturbation by modifying the beamforming vector by adding a vector from a group of vectors to the beamforming vector.

Figure 7:
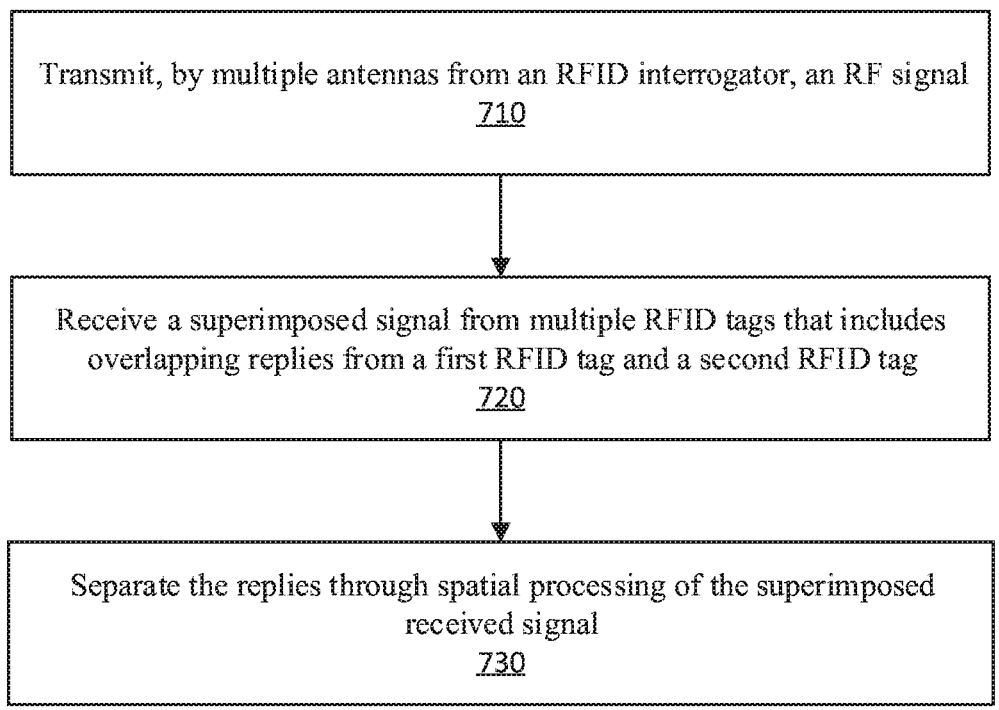
FIG. 7 is a flow diagram illustrating a method for implementing a walk-through checkout station that includes an RFID interrogator with multiple antennas, in accordance with the present invention.

FIG. 7 is a flow diagram illustrating a system/method 700 for implementing a walk-through checkout station that includes an RFID interrogator with multiple antennas, in accordance with the present invention.

At block 710, the RFID interrogator 510 transmits by multiple antennas, an RF signal. The RF signal is transmitted within a scanning area through which multiple RFID tags 240 can be carried.

At block 720, the RFID interrogator 510 receives a superimposed received signal. The superimposed received signal includes replies from a first RFID tag and a second RFID tag that are overlapping in time. RFID interrogator 510 may receive the superimposed signal (or portions of the signal) from stationary reflectors that shapes a reading region (within a scanning area).

At block 730, the RFID interrogator 510 separates the replies from the first RFID tag and second RFID tag though spatial processing of the superimposed received signal.

Figure 8:
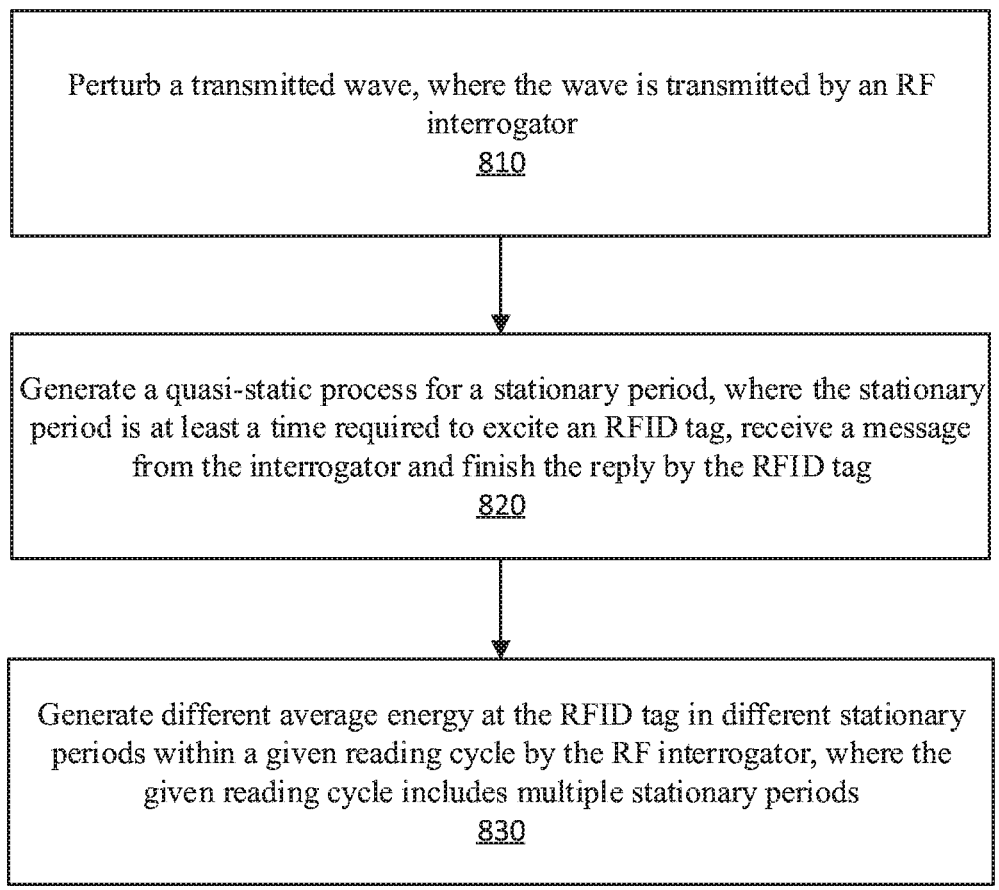
FIG. 8 is a flow diagram illustrating another method for implementing a walk-through checkout station that includes an RFID interrogator with multiple antennas, in accordance with the present invention.

FIG. 8 is a flow diagram illustrating a system/method 800 for implementing a walk-through checkout station that includes an RFID interrogator with multiple antennas, in accordance with the present invention.

At block 810, perturbing, by a processing device, a transmitted wave. The wave is transmitted by an RF interrogator. In an example embodiment, the perturbation is generated by movement of a reflecting body. In another example embodiment, the perturbation is generated by movement of a transmit antenna. In a further example embodiment, the perturbation is generated by electrical manipulation of a transmit antenna feed.

At block 820, a quasi-static process is generated for a stationary period. The stationary period is at least a time required to excite at least one RFID tag, receive a message from the interrogator and finish the reply by the at least one RFID tag.

At block 830, different average energy is generated at the RFID tags in different stationary periods within a given reading cycle by the RF interrogator. The given reading cycle includes multiple stationary periods.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing a radio frequency identifier (RFID) system, comprising:
   transmitting a radio frequency (RF) signal, by an RFID interrogator with plurality of antennas;
   receiving, at the RFID interrogator, a superimposed received signal, wherein the superimposed received signal includes replies from a first RFID tag and a second RFID tag that are overlapping in time;
   separating the replies from the first RFID tag and second RFID tag though spatial processing of the superimposed received signal; and
   processing at least one vector of the superimposed received signal y by N antennas using U, wherein U is an N ×N unitary matrix, wherein a processed vector ŷ=Uy includes two orthogonal views of the superimposed received signal y.

2. The method as recited in claim 1, wherein the RF signal is transmitted in a mode selected from the group consisting of time division duplex (TDD) mode and frequency division duplex (FDD) mode.

3. The method as recited in claim 2, wherein each port is connected to a different one of the plurality of antennas.

4. The method as recited in claim 1, further comprising:
   performing simultaneous multi-tag reading in at least one of single frequency and multiple frequencies.

5. The method as recited in claim 1, further comprising:
   receiving the superimposed received signal from at least one stationary reflector that shapes a reading region.

6. The method as recited in claim 1, further comprising:
   identifying tags that are in different sessions, wherein a session is a four-dimensional section marked by a limited time interval in a particular tunnel.

7. The method as recited in claim 1, further comprising:
   modelling at least one channel from at least one tag to a receiving antenna at the RF interrogator as H;
   determining a received vector y by y=Hx+z,
   where x is at least one vector of a transmitted signal vector from the at least one tag, and z is additive noise.

8. A method for implementing a radio frequency identifier (RFID) system, comprising:
   perturbing a transmitted wave using a processor device, wherein the wave is transmitted by an RF interrogator, the processor device being configured to generate perturbation by causing electrical manipulation of a transmit antenna feed when perturbing the transmitted wave;
   generating a quasi-static process for a stationary period, wherein the stationary period is at least a time required to excite at least one RFID tag, receive a message from the RFID interrogator and finish the reply by the at least one RFID tag; and
   generating different average energy at the at least one RFID tag in different stationary periods within a given reading cycle by the RF interrogator, wherein the given reading cycle comprises of plurality of stationary periods.

9. The method as recited in claim 8, wherein, when perturbing the transmitted wave, the processor device is further configured to:
   generate perturbation by causing movement of a transmit antenna.

10. The method as recited in claim 8, wherein, when perturbing the transmitted wave, the processor device is further configured to:
    generate perturbation by causing by movement of a reflecting body.

11. The method as recited in claim 8, wherein a beamforming vector is used for transmission of a stream to the at least one RFID tag and the perturbation is performed by modifying the beamforming vector by adding a random vector to the beamforming vector.

12. The method as recited in claim 8, wherein a beamforming vector is used for transmission of a stream to the at least one RFID tag and the perturbation is performed modifying the beamforming vector by adding a vector from a group of vectors to the beamforming vector.

13. A computer system for implementing a radio frequency identifier (RFID) system, comprising:
    a processor device operatively coupled to a memory device, the processor device being configured to:
    transmit a radio frequency (RF) signal, by an RFID interrogator with plurality of antennas;
    identify tags that are in different sessions, wherein a session is a four-dimensional section marked by a limited time interval in a particular tunnel;
    receive a superimposed received signal, wherein the superimposed received signal includes replies from a first RFID tag and a second RFID tag that are overlapping in time; and
    separate the replies from the first RFID tag and second RFID tag though spatial processing of the superimposed received signal.

14. The system as recited in claim 13, wherein the RF signal is transmitted in a mode selected from the group consisting of time division duplex (TDD) mode and frequency division duplex (FDD) mode.

15. The system as recited in claim 14, wherein each port is connected to a different one of the plurality of antennas.

16. The system as recited in claim 13, wherein the processor device is further configured to:
    perform simultaneous multi-tag reading in at least one of single frequency and multiple frequencies.

17. A computer system for implementing a radio frequency identifier (RFID) system, comprising:
    a processor device operatively coupled to a memory device, the processor device being configured to:
    perturb a transmitted wave, wherein the wave is transmitted by an RF interrogator, the processor device being further configured to generate perturbation by causing electrical manipulation of a transmit antenna feed when perturbing the transmitted wave;
    generate a quasi-static process for a stationary period, wherein the stationary period is at least a time required to excite at least one RFID tag, receive a message from the interrogator and finish the reply by the at least one RFID tag; and
    generate different average energy at the at least one RFID tag in different stationary period within a given reading cycle by The RF interrogator, wherein the given reading cycle comprises of plurality of stationary periods.

* * * * *